United States Patent
Biswa et al.

(10) Patent No.: US 10,988,571 B2
(45) Date of Patent: Apr. 27, 2021

(54) QUORUM SENSING BASED POLYMER FOR STIMULATION OF BIOFILMS AND RELATED PHENOTYPES, AND SYNTHESIS PROCESS THEREOF

(71) Applicant: FIB-SOL Life Technologies Private Limited, Chennai (IN)

(72) Inventors: Pramal Biswa, Chennai (IN); Bijja Rajashekhar, Chennai (IN)

(73) Assignee: FIB-SOL Life Technologies Private Limited, Chennai (IN)

(*) Notice: Subject to any disclaimer, the term of this patent is extended or adjusted under 35 U.S.C. 154(b) by 189 days.

(21) Appl. No.: 16/047,218

(22) Filed: Jul. 27, 2018

(65) Prior Publication Data
US 2020/0031989 A1    Jan. 30, 2020

(51) Int. Cl.
| C08G 63/08 | (2006.01) |
| C08G 69/16 | (2006.01) |
| C08G 64/02 | (2006.01) |
| C08G 64/38 | (2006.01) |
| C08G 63/64 | (2006.01) |
| C08G 63/685 | (2006.01) |
| A01N 37/00 | (2006.01) |

(52) U.S. Cl.
CPC ............. *C08G 63/08* (2013.01); *A01N 37/00* (2013.01); *C08G 63/64* (2013.01); *C08G 63/6852* (2013.01); *C08G 64/0208* (2013.01); *C08G 64/0241* (2013.01); *C08G 64/38* (2013.01); *C08G 69/16* (2013.01)

(58) Field of Classification Search
None
See application file for complete search history.

(56) References Cited

U.S. PATENT DOCUMENTS

2015/0134048 A1*  5/2015  Ding ................ C08G 63/64
                                                     623/1.46

* cited by examiner

*Primary Examiner* — Rachel Kahn (57) ABSTRACT

The invention relates to the synthesis and process thereof of a Quorum Sensing (QS) based polymer formed by the process of ring opening polymerization/ring opening copolymerization. The formed homopolymer or heteropolymer or copolymer displays increased half-life, bioactivity and biostability in stimulating the microbial quorum sensing in a predetermined microbial population.

4 Claims, 4 Drawing Sheets p = 1, X = NH, α-acetolactam; p = 2, X = NH, β-propiolactam; p = 3, X = NH, γ-butyrolactam; p = 4, X = NH, δ-velarolactam; p = 5, X = NH, ε-caprolactam; p = 1, X = O, α-acetolactone; p = 2, X = O, β-propiolactone; p = 3, X = O, γ-butyrolactone; p = 4, X = O, δ-velarolactone; p = 5, X = O, ε-caprolacton and etc.; Y = O (or) S Scheme 1. Synthesis of a) poly (N-acyl homoserine lactone) and b) poly (cyclic amide/ester-co-N-acyl homoserine lactone)

QUORUM SENSING BASED POLYMER FOR STIMULATION OF BIOFILMS AND RELATED PHENOTYPES, AND SYNTHESIS PROCESS THEREOF

STATEMENT REGARDING PRIOR DISCLOSURES BY THE INVENTOR OR A JOINT INVENTOR

A prior Indian Patent Application No. 201641027672, now Patent No. 298859, was filed by the inventors on Sep. 12, 2016 and first published on Oct. 6, 2017.

TECHNICAL FIELD

The present invention relates to techniques and products for controlling expression of bacterial phenotypes. The invention relates particularly to molecules associated with quorum sensing and more particularly to polymer and co-polymer products of a typical class of quorum sensing molecules, namely acyl homoserine lactone.

BACKGROUND

For a world which will be filled with more than 9 billion people by 2050, with a focus shifting towards urbanization, attaining food and nutritional security is a key global challenge. Agriculture plays an imperative role in India's economy (with over 58 percent of the rural households depending on it as their primary source of income). However, the per unit area productivity of Indian agriculture is much lower than other major crop producing countries. Raising productivity per unit of land will need to be the main engine of agricultural growth as virtually all cultivable land is farmed. In this regard, bacterial colonies associated with roots of plants in the rhizosphere play a major role.

Bacteria communicate with each other by small auto-generated signal molecules, which are termed as auto inducers (AIs in brief). During the bacterial growth, these auto inducers are produced continuously and are subsequently secreted in the extracellular environment. When the concentration of the signal molecules reaches a threshold value, the expression of relevant genes in bacteria is initiated to adapt to the environmental changes. Such a regulatory system is termed as microbial quorum sensing (QS) signal systems. QS enables unicellular bacteria to imitate multicellular organisms to accomplish some behaviours that cannot be accomplished when they are unicellular individuals.

Acyl-homoserine lactones (AHLs) are compounds naturally produced by Gram-negative bacteria. It has been proposed that they could act as signalling molecules: the excreting bacteria might recognize the concentration of said molecules in the environment, and control their growth or other cellular function as production of antibiotics in a population density dependent manner. These signal molecules vary in their acyl chain length and substitution to achieve specificity in the communication cascade.

It has been also reported that the AHL language may also be understood by the plants, allowing them to prepare for a microbial attack or for contact with a symbiotic bacterial partner. For e.g. Proteome analysis show that the legume *Medicago truncatula* responds to the presence of synthetic and purified AHLs from its symbiont *Sinorhizobium melilotti* with specific and extensive change in root protein expression, and particularly in the expression of potential defence related proteins, metabolic enzymes, and proteins involved in the recognition of plant hormones auxin and cytokinin.

Biofertilizers or microbial inoculants represent the current as well as future directive of Indian agriculture owing to their role in crop productivity, soil maintenance, low cost availability and overall eco-friendly nature. As per NOVONOUS 2016 estimates, Asia Pacific Bio Fertilizer market is expected to register second largest growth rate of 11.40% till 2020. This expansion is supported by the growing demand to step up the yield of intensely cultivated food crops such as rice, soybeans, wheat and corn.

Conventional practice of plant inoculation with monocultures or mixed cultures of effective microbes does not give the highest microbial effect which may only be achieved by biofilm formation, giving rise to the recently popularized agricultural concept of Biofilmed Biofertilizers (BB). Biofilms associated with plant roots of some crops help in the re-cycling of nutrients, phytohormone production and infection control by other microbes, resulting in enhanced agriculture potency. Along with the biofertilizers, biostimulants such as seaweed extracts, humic substances (humic acid and fulvic acid), amino acids & additives (polysaccharides, enzymes, soil conditioners, wetting agents, and antioxidants) are commonly used to enhance crop growth during harsh conditions in these regions but also improve the crop yield and quality.

Several data exhibit that many favourable traits in Plant Growth Promoting Rhizobacteria (PGPRs), such as production of antimicrobials, cell-wall degrading enzymes, plant colonization, are controlled by AHLs and other signalling molecules which synchronize the purposes of the different populations in the rhizosphere communities. QS Regulation is specific, with several signal pattern and distinct QS systems showcased by various strains of the same species.

Apart from the above-mentioned phenotypes AHLs have also been found to have interkingdom consequences whereby the molecule induces sensitization or priming of plants to prospective pathogens by initiating actions. AHLs with a longer acyl chain such as C12 or C14 were found to be particularly effective in this regard. On the other hand, AHLs with short acyl chain C4 or C6 were reported to be involved in increasing the growth rate and primary root elongation.

Although AHL supplementation has shown positive response in many agricultural studies, the major factor however, which has prevented its wide use is its cost, instability and probable loss during processes like irrigation. Hence there is a long-standing need for localization and stabilization of QS signals in a reusable cost-effective system for the purpose of augmenting growth and stimulating functions of various plant associated bacteria.

Accordingly, the present invention which may provide new homopolymers, heteropolymers or copolymers of signalling molecules involved in bacteria quorum sensing with increased biostability and bioactivity, may solve a long-standing need.

SUMMARY

This summary is provided to introduce aspects related to development of a quorum sensing (QS) based polymer for localization of QS signals in a reusable cost-effective system for the purpose of augmenting growth and stimulating functions of various microbes. This summary is however not intended to disclose essential features of the innovation and nor is intended to determine, limit or restrict the scope of the innovation.

In accordance with yet another aspect of the invention, the features of a polymer, wherein the polymer comprises polymerization products of either a monomer having Formula I to obtain a homopolymer or a heteropolymer, or, of a monomer selected at least from a group of monomers having Formula II, Formula III, Formula IV, Formula V or Formula VI, and a monomer having Formula I, to obtain a copolymer, and wherein, the homopolymer, heteropolymer, or copolymer comprise of an active ingredient belonging to a class of signalling molecules involved in bacteria quorum sensing, characterized in that said homopolymer or heteropolymer or copolymer with said active ingredient has stable bioactivity stimulating quorum sensing signal systems within a predetermined population of micro-organisms for at least 2 months, are disclosed.

In accordance with another aspect of the invention, the features of a process for synthesis of a polymer, wherein the process involves an initial step, either of adding a monomer having Formula I and an active ingredient belonging to a class of signalling molecules involved in bacteria quorum sensing and dissolved in dry solvent to a reaction vessel containing initiator or catalyst in a dry solvent and a co-initiator or co-catalyst, or of adding monomer having Formula II, Formula III, Formula IV, Formula V or Formula VI, and a co-catalyst in a reaction vessel containing catalyst in a dry solvent, and further adding a monomer with Formula I dissolved in a little amount of dry solvent to the reaction vessel and closing mouth of the vessel with stopper, are disclosed. The process may further comprise a second step of stirring the contents of the flask at a temperature in the range of 50 degrees Celsius to 250 degree Celsius for a time period between 1 hour to 24 hours, may further comprise a third step of removal of solvent under vacuum at room temperature, may further comprise a fourth step of dissolving the contents of the reaction vessel in minimum quantity of polar solvent and pouring into cold alcohol to obtain crude homopolymer or crude heteropolymeror crude copolymer, may further comprise a fifth step of washing crude homopolymer or crude heteropolymer or crude copolymer with minimum quantity of cold alcohol and filtering off the precipitate using a filtration assembly and may lastly comprise a sixth and final step of complete drying under vacuum to obtain final homopolymer or final heteropolymer or final copolymer.

In accordance with yet another aspect of the invention, the features of the polymer, wherein, monomers having formula I, may include but are not limited to, N-Hexanoyl-DL-homoserine lactone, N-Heptanoyl-DL-homoserine lactone, N-Decanoyl-DL-homoserine lactone, N-(3-Oxodecanoyl)-L-homoserine lactone, N-Tetradecanoyl-DL-homoserine lactone, N-(3-Oxododecanoyl)-L-homoserine lactone, N-(p-Coumaroyl)-L-homoserine lactone, are disclosed. The invention may comprise monomers having formula II, wherein, the monomers may include but are not limited to, α-acetolactone, β-propiolactone, γ-butyrolactone, δ-valerolactone, ε-caprolactone. The invention may comprise monomers having formula III, wherein, the monomers may include but are not limited to, D-lactide (D-LA), L-lactide (L-LA), rac-lactide (r-LA), meso-lactide (m-LA). The invention may comprise monomers having formula IV, wherein, the monomers may include but are not limited to α-acetolactam, β-propiolactam, γ-butyrolactam, δ-valerolactam, ε-caprolactam. The invention may comprise monomers having formula V, wherein, the monomers may include but are not limited to trimethylene carbonate, cyclohexene carbonate, ethylene carbonate, propylene carbonate. The invention may comprise monomers having formula VI, wherein, the monomers may include but are not limited to epichlorohydrin, butylene oxide, propylene oxide, ethylene oxide.

In accordance with yet another aspect of the invention, the features of the process of synthesis a polymer, wherein the process may comprise catalysts or initiators of the reaction comprising one or more of hydrochloric acid, sulfonic acid, triflic acid, Lewis acids, ferric chloride, zinc acetate, copper acetate, cobalt chloride, manganese sulphate, organocatalysts, organometallic compounds of alkali, alkaline earth, transition, lathanide and actinide, metals in combination with the achiral and chiral ligands such as alkoxide, salen, salalen, phenolate, bis(phenolate), tris(phenolate), iminophenoxide, bis(iminophenoxide), Trost's semicrown compounds or enzymes, are disclosed. The process may further comprise co-initiator of the reaction comprising one or more of ethanol, isopropyl alcohol, n-butyl alcohol or benzyl alcohol. The process may further comprise solvents including but not limited to tetrahydrofuran, toluene, xylene, n-hexane, and/or dichloromethane.

In accordance another aspect of the invention, the features of the polymer, wherein the active ingredient may comprise N-acyl homoserine lactone, is disclosed.

In accordance with yet another aspect of the invention, the features of the polymer, wherein, the polymer may be formed by ring opening polymerization, and wherein the polymer formed may comprise a backbone comprising at least said active ingredient belonging to a class of signalling molecules involved in microbial quorum sensing, are disclosed.

In accordance with yet another aspect of the invention, the features of the polymer, polymer may activate microbial phenotypes for one or more functions dependent on quorum sensing signalling systems, characterized in that, polymer-based-activation of quorum sensing signalling systems may result in beneficial phenotypes such as biofilm formation by Plant Growth Promoting Rhizobacteria, enhanced nitrogen fixation by soil microbes, biocontrol agent production, etc and this results in increased crop yield and productivity, are disclosed.

BRIEF DESCRIPTION OF THE DRAWINGS

The detailed description is described with reference to the accompanying figures. In the figure, the left-most digit(s) of a reference number identifies the figure in which the reference number first appears. The same numbers are used throughout the drawings to refer like features and components.

The figures depict embodiments of the present disclosure for purposes of illustration only. One skilled in the art will readily recognize from the following description that alternative embodiments of the steps illustrated herein may be employed without departing from the principles of the disclosure described herein.

DETAILED DESCRIPTION

The invention relates to development of a quorum sensing (QS) based polymer for localization of QS signals in a reusable cost-effective system for the purpose of augmenting growth and stimulating functions of various plant associated bacteria.

Some embodiments of this disclosure, illustrating all its features, will now be discussed in detail. The words "comprising "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that, the singular forms "a," "an," and "the" include plural references unless the context clearly dictates otherwise.

It will be understood by all readers of this written description that the example embodiments described herein and claimed hereafter may be suitably practiced in the absence of any recited feature, element or step that is, or is not, specifically disclosed herein. For instance, references in this written description to "one embodiment," "an embodiment," "an exemplary embodiment," and the like, indicate that the embodiment described can include a particular feature, structure, or characteristic, but every embodiment may not necessarily include the particular feature, structure, or characteristic. The disclosed embodiments are merely exemplary of various forms or combinations. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

No terminology in this application should be construed as indicating any non-claimed element as essential or critical. The use of any and all examples, or example language (e.g., "such as") provided herein, is intended merely to better illuminate example embodiments and does not pose a limitation on the scope of the claims appended hereto unless otherwise claimed.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range. For example, a range of "about 0.1% to about 5%" or "about 0.1% to 5%" may be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

In one embodiment, the invention relates to polymerization products of a class of signalling molecules involved in bacterial quorum sensing systems. "Quorum sensing" allows a microbial community to synchronise growth and development and, when the minimum population or "quorum" has been achieved, to initiate a concerted population response particularly in response to environmental cues such as nutrient availability, temperature or pH which is critical to microbe success. The quorum sensing mechanism is dependent on the production, secretion, and detection of small diffusible autoinducers which can be employed to control various parameters affecting growth of microorganisms and associated plant species. Various types of quorum sensing inducers are known in the prior art. One common class of molecules involved in quorum sensing are quinolones, identified for e.g. in *P. aeruginosa*. Cell signalling in this system occurs through members of a family of quinolone compounds termed 4-hydroxy-2-alkylquinolines (HAQs. Synthesis of HAQs is controlled by the transcriptional regulator MvfR, which modulates expression of several genes involved in the production of anthranilic acid and its conversion to 4-hydroxy-2-heptylquinoline (HHQ). HHQ is then converted to 3,4-dihydroxy-2-heptylquinoline, also known as *Pseudomonas* quinolone signal (PQS), through the action of PqsH. Another known class of molecules involved in quorum sensing particularly in gram-positive bacteria like *S. aureus* relate to modified oligopeptides called autoinducing peptides (AIPs). Yet another class of molecules particularly known to be involved in quorum sensing relate to molecules controlled by the lux-type quorum-sensing system. The lux-type quorum sensing system is the archetypal and preeminent mechanism for species-specific communication in gram-negative bacteria. A class of signalling pheromones upon which lux-type quorum sensing is based have been identified as N-acyl-L-homoserine lactones, to which the present invention particularly relates to in one of its embodiments.

In another embodiment of the present invention, the invention relates to a class of signalling molecules more particularly involved in quorum sensing mechanism of gram negative bacteria and in particular, preferably relates to N-acyl-L-homoserine lactones and their derivatives. N-acyl-L-homoserine lactone molecules comprise a homoserine lactone moiety (derived from amino acid metabolism, possibly via S-adenosyl methionine) linked to an acyl sidechain (probably derived from fatty acid synthesis). For e.g. in *Pseudomonas aeruginosa* there is hierarchical quorum-sensing systems. *P. aeruginosa* contains 2 LuxR/LuxI-type quorum-sensing systems, termed the las and rhl. In general, lux-type systems consist of 2 components, an autoinducer synthase (e.g., LuxI), which synthesizes AHLs from S-adenyosyl methionine, and a transcriptional regulator (e.g., LuxR). Because of its small size and lipophilic character, AHL freely diffuses across cell membranes. As the population density increases, intracellular AHL binds the functionally linked (cognate) LuxR-like receptor at a sufficient concentration within the cytoplasm to induce differential gene expression. A number of N-acyl-L-homoserine lactones with different acyl side chains have been identified in different bacterial systems where they elicit a wide range of quorum-dependent responses such as swarming, pathogenicity, conjugation or production of colour, light or antibiotics, which is in accordance with one of the embodiments of the present invention.

In another embodiment, the invention relates to polymerization products of signalling molecules involved in microbial quorum sensing systems, and more preferably to polymerization products of N-acyl-L-homoserine lactones and their derivatives. The half-life of monomers of such signalling molecules has been shown to be very short and such molecules are easily metabolised or degraded and cannot be used in the long run to modulate beneficial effects of microbial quorum sensing. Polymerization of such signalling molecules may aide in increasing the stability and bioactivity of the signalling molecules and is one of the essential features of the present invention.

Figure 1:
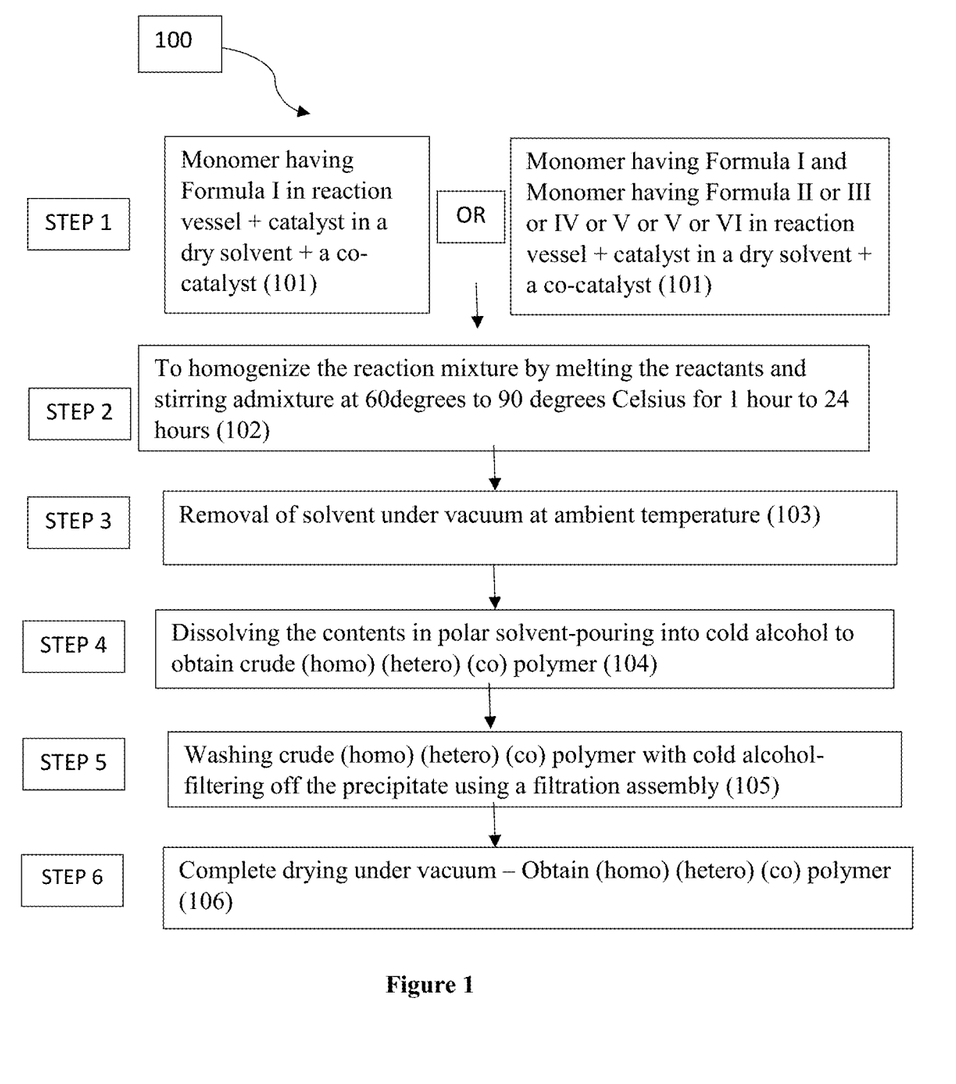
FIG. 1 illustrates an overview (100) of the process of synthesis of a polymer.
Figure 4:
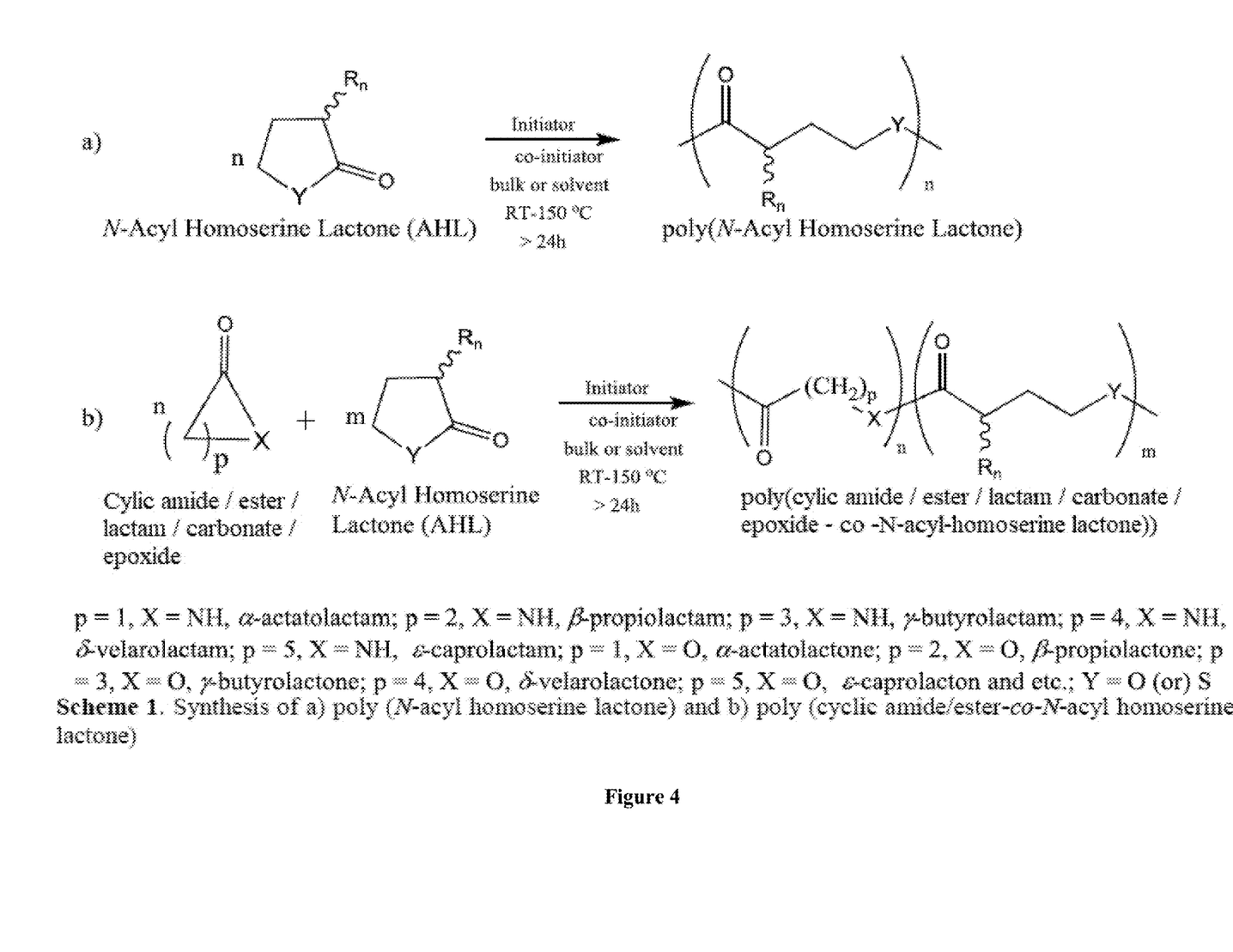
FIG. 4 illustrates a schematic representation of synthesis process for homopolymer or heteropolymer or copolymer.

Now referring to FIG. 1 and FIG. 4, which is one of the essential features of the present invention, the process of polymerization of signalling molecules involved in microbial quorum sensing is described. The process may involve an initial step (101), either of adding a monomer having Formula I and an active ingredient belonging to a class of signalling molecules involved in microbial quorum sensing and dissolved in dry solvent to a reaction vessel containing initiator or catalyst in a dry solvent and a co-initiator or co-catalyst, or of adding monomer having Formula II, Formula III, Formula IV, Formula V or Formula VI, and a co-catalyst in a reaction vessel containing catalyst in a dry solvent, and further adding a monomer with Formula I dissolved in a little amount of dry solvent to the reaction vessel and closing mouth of the vessel with stopper. The process may further comprise a second step (102) of stirring the contents of the flask at a temperature in the range of 50 degrees Celsius to 250 degree Celsius for a time period between 1 hour to 24 hours, may further comprise a third step (103) of removal of solvent under vacuum at room temperature, may further comprise a fourth step (104) of dissolving the contents of the reaction vessel in minimum quantity of polar solvent and pouring into cold alcohol to obtain crude homopolymer or crude heteropolymer or crude copolymer, may further comprise a fifth step (105) of washing crude homopolymer or crude heteropolymer or crude copolymer with minimum quantity of cold alcohol and filtering off the precipitate using a filtration assembly and may lastly comprise a sixth (106) and final step of complete drying under vacuum to obtain final homopolymer or final heteropolymer or final copolymer.

In an exemplary embodiment of the present invention, the active ingredient belonging to a class of signalling molecules involved in bacteria quorum sensing may comprise N-acyl-L-homoserine molecules.

In one embodiment of the present invention, the process of polymerization of signalling molecules involved in microbial quorum sensing may include catalysts or initiators, wherein catalysts or initiators of the reaction comprise one or more of hydrochloric acid, sulfonic acid, triflic acid, Lewis acids, ferric chloride, zinc acetate, copper acetate, cobalt chloride, manganese sulphate, organometallic compounds of alkali, alkaline earth, transition, lathanide and actinide metals in combination with the achiral and chiral ligands such as alkoxide, salen, salalen, phenolate, bis (phenolate), tris(phenolate), iminophenoxide, bis(iminophenoxide), Trost's semicrown compounds or enzymes.

In accordance with another embodiment of the present invention, the process of polymerization of signalling molecules involved in microbial quorum sensing may include co-catalysts/initiator of the reaction comprising one or more of ethanol, isopropyl alcohol, n-butyl alcohol or benzyl alcohol.

In accordance with another embodiment of the present invention, the process of polymerization of signalling molecules involved in microbial quorum sensing may include solvents including but not limited to tetrahydrofuran, toluene, xylene, n-hexane, and/or dichloromethane.

In one preferred embodiment, the present invention relates to polymerization products of signalling molecules involved in microbial quorum sensing systems and processes for the same, wherein the monomer having Formula I used in the initial step may be a compound having a general formula:

Formula 1 wherein $R_1$ may comprise hydrogen, keto, or hydroxyl groups and $R_2$ may comprise alkyl chain having 1 to 15 carbon units or may comprise alkyl/alkenyl chains having 1 to 15 carbon units.

In another preferred embodiment, the present invention relates to polymerization products of signalling molecules involved in microbial quorum sensing systems and processes for the same, wherein the monomer having Formula II used in the initial step may be a compound having a general formula:

Formula 2 wherein $R_1$ to $R_4$ may comprise hydrogen, halide, alkyl, alkoxy, cyclic alkyls or aromatic units and wherein n may comprise a value 1 or 2 or 3 or 4.

In another preferred embodiment, the present invention relates to polymerization products of signalling molecules involved in microbial quorum sensing systems and processes for the same, wherein the monomer having Formula III used in the initial step may be a compound having a general formula:

Formula 3 wherein $R_1$ to $R_4$ may comprise hydrogen, halide, alkyl, alkoxy, cyclic alkyls or aromatic units.

In another preferred embodiment, the present invention relates to polymerization products of signalling molecules involved in microbial quorum sensing systems and processes for the same, wherein the monomer having Formula IV used in the initial step may be a compound having a general formula:

Formula 4 wherein $R_1$ to $R_4$ may comprise hydrogen, halide, alkyl, alkoxy, cyclic alkyls or aromatic units and wherein n may comprise a value 1 or 2 or 3.

In another preferred embodiment, the present invention relates to polymerization products of signalling molecules involved in microbial quorum sensing systems and processes for the same, wherein the monomer having Formula V used in the initial step may be a compound having a general formula:

Formula 5 wherein $R_1$ to $R_6$ may comprise hydrogen, halide, alkyl, alkoxy, cyclic alkyls or aromatic units, and wherein n may comprise a value 0 or 1 or 2 or 3 or 4 or 5.

In another preferred embodiment, the present invention relates to polymerization products of signalling molecules involved in microbial quorum sensing systems and processes for the same, wherein the monomer having Formula VI used in the initial step may be a compound having a general formula:

Formula 6 wherein $R_1$ to $R_4$ may comprise hydrogen, halide, alkyl, alkoxy, cyclic alkyls or aromatic units, and wherein any combination of $R_1$ or $R_2$ or $R_3$ or $R_4$ may be joined together in a cyclic ring structure.

In one embodiment, the monomers having a general formula I may comprise compounds including but not limited to N-Hexanoyl-DL-homoserine lactone, N-Heptanoyl-DL-homoserine lactone, N-Decanoyl-DL-homoserine lactone, N-(3-Oxodecanoyl)-L-homoserine lactone, N-Tetradecanoyl-DL-homoserine lactone, N-(3-Oxododecanoyl)-L-homoserine lactone, N-(p-Coumaroyl)-L-homoserine lactone.

In another embodiment, the monomers having a general formula II may comprise compounds including but not limited to α-acetolactone, β-propiolactone, γ-butyrolactone, δ-valerolactone, ε-caprolactone.

In another embodiment, the monomers having a general formula III may comprise compounds including but not limited to D-lactide (D-LA), L-lactide (L-LA), rac-lactide (r-LA), meso-lactide (m-LA).

In another embodiment, the monomers having a general formula IV may comprise compounds including but not limited to, α-acetolactam, β-propiolactam, γ-butyrolactam, δ-valerolactam, ε-caprolactam.

In another embodiment, the monomers having a general formula V may comprise compounds including but not limited to Trimethylene carbonate, cyclohexene carbonate, ethylene carbonate, propylene carbonate.

In another embodiment, the monomers having a general formula VI may comprise compounds including but not limited epichlorohydrin, butylene oxide, propylene oxide ethylene oxide.

In one embodiment, invention may relate to polymerization products of signalling molecules involved in microbial quorum sensing systems and processes for the same wherein the process of polymerization may comprise ring opening polymerization. Ring-opening polymerization is defined as a form of addition polymerization, in which the terminal end of a polymer acts as a reactive centre and further cyclic monomers join to form a larger polymer chain through propagation by opening of a cyclic structure. In many cases, these ring-opening polymerizations are controlled or "living-like" polymerizations. This allows advantages over conventional or non-controlled techniques such as: control over molecular weight (predetermined molecular masses can be achieved), low polydispersity index or narrow molecular weight distribution (most of the polymer chains are similar in length), the ability to create unique polymer architectures (such as blocks, stars, and grafts), and control of chain end groups.

In a one embodiment, the invention may relate to polymerization products of signalling molecules involved in microbial quorum sensing systems and processes for the same, wherein the polymerization products of a monomer selected at least from a group of monomers having Formula II, Formula III, Formula IV, Formula V or Formula VI, and a monomer having Formula I, are polymerized by ring opening polymerization technique to obtain a copolymer and may result in a copolymer and wherein, the monomers used during the homopolymerization or heteropolymerization or copolymerization may include but are not limited to N-acyl L-homoserine lactone (AHL), propiolactone (PL), butyrolactone (BL), velarolactone (VL), caprolactone (CL); propiolactam (PLM), butyrolactam (BLM), velarolactam (VLM), caprolactam (CLM), five membered cyclic carbonates (5CC), six membered cyclic carbonates (6CC), seven membered cyclic carbonates (7CC), eight membered cyclic carbonates (8CC), epoxides (EP), D-lactide (D-LA), L-lactide (L-LA), rac-lactide (r-LA), meso-lactide (m-LA).

In a preferred embodiment of the present invention, the invention may relate to polymerization products of signalling molecules involved in microbial quorum sensing systems and processes for the same, wherein the homopolymers or heteropolymers or copolymers formed by the ring opening polymerization or ring opening co-polymerization process include but are not limited to the homopolymers or heteropolymers or copolymers enlisted in Table 1:

Table 1

Homopolymers, heteropolymers and copolymers formed by ring opening polymerization in accordance with the present invention

| Sr. No | Structure of copolymer | Name/Abbreviation of copolymer |
|---|---|---|
| 1 |  PAHL | PAHL |
| 2 |  PPL-co-PAHL (PL, AHL) | PPL-co-PAHL |
| 3 |  PBL-co-PAHL (BL, AHL) | PBL-co-PAHL |
| 4 |  PVL-co-PAHL (VL, AHL) | PVL-co-PAHL |
| 5 |  PCL-co-PAHL (CL, AHL) | PCL-co-PAHL |
| 6 |  PPLM-co-PAHL (PLM, AHL) | PPLM-co-PAHL |
| 7 |  PBLM-co-PAHL (BLM, AHL) | PBLM-co-PAHL |

TABLE 1-continued

Homopolymers, heteropolymers and copolymers formed by ring opening polymerization in accordance with the present invention

| Sr. No | Structure of copolymer | Name/Abbreviation of copolymer |
|---|---|---|
| 8 | PVLM-co-PAHL (VLM / AHL units with substituents $R_{48}$–$R_{57}$) | PVLM-co-PAHL |
| 9 | PCLM-co-PAHL (CLM / AHL units with substituents $R_{58}$–$R_{69}$) | PCLM-co-PAHL |
| 10 | P5CC-co-PAHL (5CC / AHL units with substituents $R_{70}$–$R_{74}$) | P5CC-co-PAHL |
| 11 | P6CC-co-PAHL (6CC / AHL units with substituents $R_{75}$–$R_{81}$) | P6CC-co-PAHL |
| 12 | P7CC-co-PAHL (7CC / AHL units with substituents $R_{82}$–$R_{90}$) | P7CC-co-PAHL |
| 13 | P8CC-co-PAHL (8CC / AHL units with substituents $R_{91}$–$R_{101}$) | P8CC-co-PAHL |
| 14 | PEP-co-AHL (EP / AHL units with substituents $R_{102}$, $R_{103}$) | PEP-co-PAHL |

TABLE 1-continued

Homopolymers, heteropolymers and copolymers formed by ring opening polymerization in accordance with the present invention

| Sr. No | Structure of copolymer | Name/Abbreviation of copolymer |
|---|---|---|
| 15 | PDLA-co-PAHL / PDLA / AHL ($R_{104}$) | PDLA-co-PAHL |
| 16 | PDLA-co-PAHL / PDLA / AHL ($R_{105}$) | PLLA-co-PAHL |
| 17 | PLA-co-PAHL / PLA / AHL ($R_{106}$) | PLA-co-PAHL | wherein $R_2$–$R_5$, $R_7$–$R_{12}$, $R_{14}$–$R_{21}$, $R_{22}$–$R_{22}$, $R_{34}$–$R_{38}$, $R_{40}$–$R_{46}$, $R_{48}$–$R_{56}$, $R_{58}$–$R_{68}$ are hydrogen, wherein $R_{70}$–$R_{73}$, $R_{75}$–$R_{80}$, $R_{82}$–$R_{89}$, $R_{91}$–$R_{100}$, and R102 are independently selected from a group consisting of hydrogen, halogen, alkyl, alkoxy, cyclic alkyl or aromatic groups, and wherein $R_6$, $R_{13}$, $R_{22}$, $R_{33}$, $R_{39}$, $R_{47}$, $R_{57}$, $R_{69}$, $R_{74}$, $R_{81}$, $R_{90}$, $R_{101}$, $R_{103}$, $R_{104}$, $R_{105}$, and $R_{106}$ are acyl side chains as listed in Table 2.

In another preferred embodiment, the present invention relates to polymerization products of signalling molecules involved in microbial quorum sensing systems and processes for the same, wherein Y moiety in the N-acyl L-homoserine lactone (AHL) chain is oxygen or sulphur atom, and wherein the AHL moiety includes $R_1$, $R_6$, $R_{13}$, $R_{22}$, $R_{33}$, $R_{39}$, $R_{47}$, $R_{57}$, $R_{69}$, $R_{74}$, $R_{81}$, $R_{90}$, $R_{101}$, $R_{103}$ are acyl sides chains as listed in the Table 2:

TABLE 2

List of acyl side chains of the N-acyl-L-homoserine lactone moiety used in the ring opening (co)polymerization process of the present invention.

Acyl side chains

TABLE 2-continued

List of acyl side chains of the N-acyl-L-homoserine lactone moiety used in the ring opening (co)polymerization process of the present invention.

Acyl side chains

TABLE 2-continued

List of acyl side chains of the N-acyl-L-homoserine lactone moiety used in the ring opening (co)polymerization process of the present invention.

Acyl side chains

TABLE 2-continued

List of acyl side chains of the N-acyl-L-homoserine lactone moiety used in the ring opening (co)polymerization process of the present invention.

Acyl side chains

Figure 2:
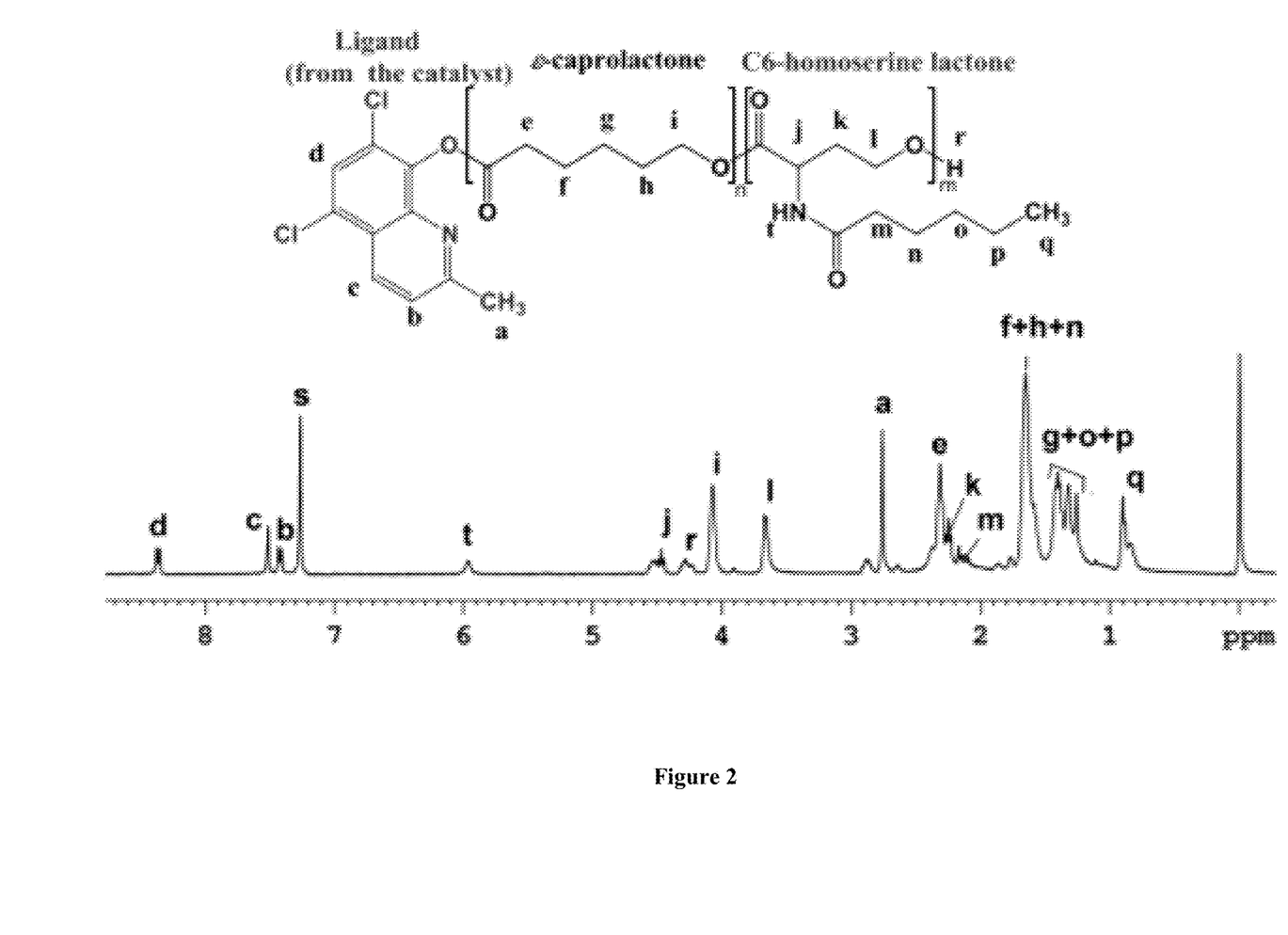
FIG. 2 illustrates $^1$H nuclear magnetic resonance spectrum of the obtained copolymer.
Figure 3A:
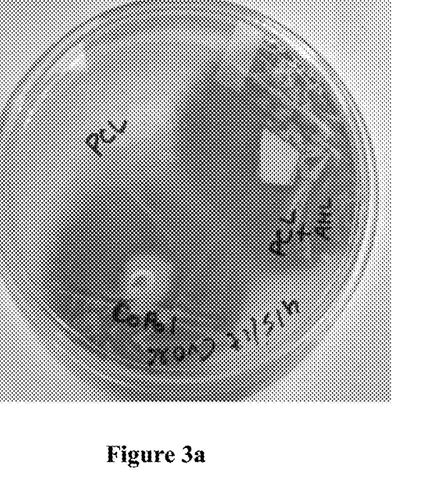
FIGS. 3a-3d illustrate bioactivity results of the copolymer tested on predetermined strain of microbial cultures.
Figure 3B:
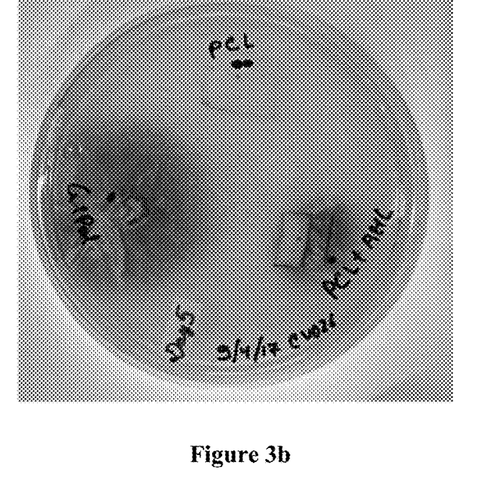
Figure 3C:
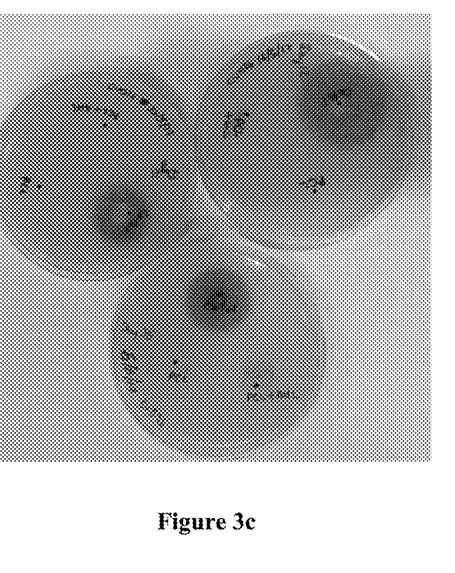
Figure 3D:
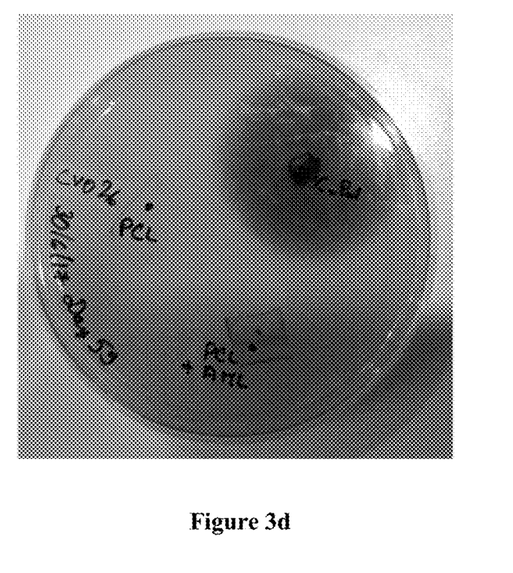

Now referring to FIG. 2, in one embodiment, the present invention may relate to polymerization products of signalling molecules involved in microbial quorum sensing systems and processes for the same, wherein nuclear magnetic resonance (NMR) spectroscopy may be used to characterize the homopolymer or heteropolymer or copolymer formed by the said process. In particular, what is displayed in FIG. 2 is the NMR spectroscopy results of a crude co-polymer formed by ε-caprolactone and N-Hexanoyl-DL-homoserine lactone, in accordance with one of the possible embodiments of the present invention.

Now referring to FIGS. 3a-3d, in one exemplary embodiment, the present invention may relate to polymerization products of signalling molecules involved in microbial quorum sensing systems and processes for the same, wherein the homopolymers, or heteropolymers of copolymers formed exhibit enhanced bioactivity and half-life and exhibit biostability for at least 2 months when tested upon predetermined bacterial population, preferably Chromobacterium violaceum CV026. Referring particularly to FIGS. 3a-3d, the cast films of the QS based copolymer Poly (AHL-co-ε-caprolactone), a blend of AHL with PCL (Poly caprolactone) are prepared. These are then placed on a lawn of the biosensor bacteria Chromobacterium violaceum CV026 (purchased from National Collection of type cultures (NCTC) UK), which responds to AHL or AHL like compounds by producing the violet pigment, Violacein. The FIGS. 3a-3d demonstrates this response for the QS based copolymer as well as for the native AHL blend with PCL, but not for the poly(ε-caprolactone) film devoid of AHL. The response for the QS-based copolymer has been observed over a period of 2 months and the FIGS. 3a-3d reveals continued bioactivity for at least 2 months as is evident from the colouration.

In one preferred embodiment, the present invention may relate to polymerization products of signalling molecules involved in microbial quorum sensing systems and processes for the same, wherein the process may include the following: to a 250 ml reaction vessel with a magnetic stirrer containing a catalyst (0.01-100 mmol) in dry solvent (0.5-15 ml) was added cyclic ester/cyclic amide/cyclic carbonate/cyclic epoxide/cyclic lactide monomer (0.01-20 mmol) followed by the addition of co-initiator (0.005-50 μmol). Later, N-acyl-L-homoserine lactone monomer (0.01-20 mmol) dissolved in the little amount of dry solvent (0.5-15 ml) was added to the reaction mixture. The whole contents were closed with a stopper under inert condition and allowed to stir at a temperature preferably in the range of 50 degrees Celsius to 250 degrees Celsius. After 24 hr reaction contents brought to room temperature and solvent was removed under vacuum. The dried reaction mixture was dissolved in minimum quantity of polar solvent and poured into cold alcohol which resulted a crude copolymer. Wash the crude copolymer 1-2 times with minimum quantity of cold alcohol and filter off the precipitate using a filtration assembly, preferably, a Buchner funnel followed by complete drying under vacuum. The compound was characterized by NMR spectroscopy, MALDI-ToF.

In accordance with one exemplary embodiment of the present invention, the present invention may relate to polymerization products of signalling molecules involved in microbial quorum sensing systems and processes for the same, wherein the process may include the following: to a 100 ml reaction vessel with a magnetic stirrer containing triethyl borane (50 μmol) in dry toluene (5 ml) was added ε-caprolactone monomer (10 mmol) followed by the addition of bis(triphenylphosphine)iminium chloride (25 μmol). Later, N-Hexanoyl-DL-homoserine lactone (AHL) monomer (10 mmol) dissolved in the little amount of dry toluene (10 ml) was added to the reaction mixture. The whole contents were closed with a stopper under inert condition and allowed to stir at 80° C. temperature. After 24 hours reaction contents brought to room temperature and toluene was removed under vacuum. The dried reaction mixture was dissolved in minimum quantity of dichloromethane and poured into cold methanol which resulted a crude copolymer. Wash the crude copolymer 2-3 times with minimum quantity of cold methanol and followed by complete removal of methanol by drying under vacuum. The compound was characterized by NMR spectroscopy, MALDI-ToF and molecular weight of the copolymer was analyzed by Gel permeation chromatography, in accordance with an exemplary embodiment of the present invention.

In one preferred embodiment, the present invention may relate to polymerization products of signalling molecules involved in microbial quorum sensing systems and processes for the same, wherein the process may include the following: to a reaction vessel of appropriate volume with a stirring mechanism containing a catalyst (0.1-5 mole ratio) in a dry solvent of appropriate volume was added monomers, wherein monomers includes molecules having Formula I-VI, their ratios vary as follows; for the homopolymerization ratio of Formula I and either of Formula II-VI is 100:0 and for the copolymerization ratio of Formula I and either of Formula II-VI ranging from 99:1 to 1:99 followed by the addition of co-initiator (0.01-3 mole ratio). The whole contents were maintained under inert condition and allowed to stir at a temperature preferably in the range of 50 degrees Celsius to 250 degrees Celsius. After the completion of the polymerization reaction contents were brought to room temperature and solvent was removed under vacuum. The dried reaction mixture was dissolved in minimum quantity of polar solvent and poured into cold alcohol which resulted a crude copolymer. Wash the crude copolymer 1-2 times with minimum quantity of cold alcohol and filter off the precipitate using a filtration assembly, preferably, a Buchner funnel followed by complete drying under vacuum.

In accordance with another embodiment of the present invention, the present invention may relate to polymerization products of signalling molecules involved in microbial quorum sensing systems and processes for the same, wherein the target group of microbial communities for the expression of molecules of interest by quorum sensing systems may include but are not limited to Plant Growth Promoting Rhizobacteria (PGPRs), and features of interest to be invoked by the quorum sensing mechanism may include features such as production of antimicrobials, cell-wall degrading enzymes, plant colonization etc. through quorum sensing systems.

In another embodiment, the invention may relate to polymerization products of signalling molecules involved in microbial quorum sensing systems and processes for the same, wherein the developed polymer may stimulate Vesicular Aruscular Mycorrhizal (VAM) fungi germination and attract algal spores facilitating healthy inter-kingdom interactions, and wherein the polymer increases the resistance of plants against harmful microbial pathogens through stimulation of the plant immune system. In accordance with an aspect of the healthy inter-kingdom interactions may stimulate growth and productivity of the plants and may provide marked commercial benefits.

In another embodiment, the invention may relate to polymerization products of signalling molecules involved in bacterial quorum sensing systems and processes for the same, wherein the polymer is synthesized into a membrane by processing techniques like electrospinning, force spinning, mechanical drawing, sol-gel synthesis, casting systems, wet-laid spinning and any other process of making films and is alternatively used as solid pellets or as liquid formulation either alone or in combination with suitable carrier formulations.

The present invention as described in the foregoing description, uses biological material sourced from within the territory of India and the source of the biological material used have been indicated in the application. All the requisite formalities related to the present application under the Biodiversity Act 2002, if any, will be undertaken for compliance before the grant of the patent.

The foregoing description shall be interpreted as illustrative and not in any limiting sense. A person of ordinary skill in the art would understand that certain modifications could come within the scope of this disclosure.

What is claimed is:

1. A polymer comprising a polymerization product of:
   one or more monomers having a structure of formula I or formula Ia, and
   optionally, one or more comonomers having a structure selected from the group consisting of formulas II, III, IV, V and VI;
   wherein formula I has a structure:

wherein $R_1$ of formula I is hydrogen or a hydroxyl group, and wherein $R_2$ of formula I is a $C_{1-15}$ alkyl group or $C_{1-15}$ alkenyl group;
wherein formula Ia has a structure:

wherein $R_2$ of formula Ia is a $C_{1-15}$ alkyl group or $C_{1-15}$ alkenyl group;
wherein formula II has a structure:

wherein $R_1$ to $R_4$ of formula II are independently selected from the group consisting of hydrogen, halogen, alkyl, alkoxy, and an aromatic group, and wherein "n" of formula II is 1, 2, 3 or 4;
wherein formula III has a structure:

wherein $R_1$ to $R_4$ of formula III are independently selected from the group consisting of hydrogen, halogen, alkyl, alkoxy, and an aromatic group;
wherein formula IV has a structure:

wherein $R_1$ to $R_4$ of formula IV are independently selected from the group consisting of hydrogen, halogen, alkyl, alkoxy, and an aromatic group, and wherein "n" of formula IV is 1, 2 or 3;
wherein formula V has a structure:

wherein $R_1$ to $R_6$ of formula V are independently selected from the group consisting of hydrogen, halogen, alkyl, alkoxy, and an aromatic group, and wherein "n" of formula V is 0, 1, 2, 3, 4, or 5; and
wherein formula VI has a structure:

wherein $R_1$ to $R_4$ of formula VI are independently selected from the group consisting of hydrogen, halogen, alkyl, alkoxy, and an aromatic group;
and wherein the polymer is a homopolymer, copolymer or heteropolymer.

2. The polymer as claimed in claim 1, wherein
a. formula I has a structure selected from the group consisting of N-hexanoyl-DL-homoserine lactone, N-heptanoyl-DL-homoserine lactone, N-decanoyl-DL-homoserine lactone and N-tetradecanoyl-DL-homoserine lactone;

b. formula Ia has a structure selected from the group consisting of N-(3-oxodecanoyl)-L-homoserine lactone and N-(3-oxododecanoyl)-L-homoserine lactone;
c. formula II has a structure selected from the group consisting of β-propiolactone, γ-butyrolactone, δ-valerolactone, and ε-caprolactone;
d. formula III has a structure selected from the group consisting of D-lactide (D-LA), L-lactide (L-LA), rac-lactide (r-LA), and meso-lactide (m-LA);
e. formula IV has a structure selected from the group consisting of β-propiolactam, γ-butyrolactam, δ-valerolactam, and ε-caprolactam;
f. formula V has a structure selected from the group consisting of trimethylene carbonate, ethylene carbonate, and propylene carbonate; and
g. formula VI has a structure selected from the group consisting of epichlorohydrin, butylene oxide, propylene oxide and ethylene oxide.

3. The polymer as claimed in claim 1, wherein the polymer is formed by a ring opening polymerization process.

4. The polymer as claimed in claim 1, wherein the polymer is made by a process comprising the steps of:
a. an initial step, either of adding monomer having the Formula I or Ia dissolved in dry solvent to a reaction vessel containing initiator or catalyst in a dry solvent and a co-initiator or co-catalyst, or alternatively, of adding monomer having the Formula II, the Formula III, the Formula IV, the Formula V or the Formula VI, and a co-catalyst in a reaction vessel containing catalyst in a dry solvent, and further adding the monomer with the Formula I or Ia dissolved in an amount of dry solvent to the reaction vessel, and closing the mouth of the vessel with a stopper,
b. a second step of stirring the contents of the vessel so as to homogenize the reaction mixture by melting the reactants, said melting carried out at temperature range of 60-90 degrees Celsius for a time period ranging between 1 to 24 hours,
c. a third step of removal of solvent under vacuum at ambient temperature,
d. a fourth step of dissolving the contents of the flask in minimum quantity of a polar solvent and pouring into cold alcohol to obtain crude homopolymer or crude heteropolymer or crude copolymer,
e. a fifth step of washing crude homopolymer or crude heteropolymer or crude copolymer with minimum quantity of cold alcohol and filtering off the precipitate using a filtration assembly, and
f. a sixth and final step of complete drying under vacuum to obtain the homopolymer or heteropolymer or copolymer.

* * * * *